United States Patent [19]

Crawford et al.

[11] 4,003,941

[45] Jan. 18, 1977

[54] PROCESS FOR PRODUCING POLYHALOCARBONS OXIDES

[75] Inventors: George H. Crawford, White Bear Lake; Nicholas Kowanko, Minneapolis, both of Minn.

[73] Assignee: Minnesota Mining and Manufacturing Company, St. Paul, Minn.

[22] Filed: May 16, 1973

[21] Appl. No.: 360,905

Related U.S. Application Data

[63] Continuation of Ser. No. 525,357, Feb. 7, 1966, abandoned.

[52] U.S. Cl. ............................ 260/463; 260/535 H; 260/544 F; 260/615 BF; 252/54
[51] Int. Cl.² ................. C08G 67/00; C07C 43/17
[58] Field of Search ............ 260/463, 535 H, 544 F

[56] References Cited

UNITED STATES PATENTS

| | | | |
|---|---|---|---|
| 3,392,097 | 7/1968 | Gozzo et al. | 204/159.22 |
| 3,442,942 | 5/1969 | Sianesi et al. | 260/544 |
| 3,699,145 | 10/1972 | Sianesi et al. | 260/463 |

OTHER PUBLICATIONS

Gozzo et al., Nature, vol. 206, No. 4963, pp. 507–508, May 1, 1965.

*Primary Examiner*—Donald G. Daus
*Assistant Examiner*—Diana G. Rivers
*Attorney, Agent, or Firm*—Alexander, Sell, Steldt & DeLaHunt

[57] ABSTRACT

A process for the production of polyhalocarbon oxides not requiring the use of light is disclosed. This process involves introducing into a reaction zone perhaloolefin and ozone. The polymers obtained are substantially free of oxidizing linkages. The polyhalocarbon oxides and hydrolyzed products obtained therefrom are useful as intermediates for stabilized materials useful, for instance, as heat transfer media and lubricants, and for cured materials useful, for instance, in sealant systems and adhesive systems.

7 Claims, No Drawings

PROCESS FOR PRODUCING POLYHALOCARBONS OXIDES

This is a continuation of application Ser. No. 525,357 filed Feb. 7, 1966 now abandoned.

This invention relates to new and very useful processes for reacting ozone and perhaloolefins, to polyhalocarbon oxides resulting therefrom, and to new and useful products made therefrom.

Polyhalocarbon oxides are halogen-containing polymeric materials which characteristically contain ether linkages in their molecular backbones. The carbon atoms are joined to each other, to oxygen atoms, and/or to halogen atoms. Usually no appreciable amounts of hydrogen are present in such polymers.

Heretofore, the art has generally appreciated that polyhalocarbon oxides can be produced by several processes. In one process, perfluorinated olefins are copolymerized with oxygen under ultraviolet radiation. In a second process, fluorocarbon epoxides are polymerized in the presence of an appropriate catalyst. In a third process, oxygen-containing perfluorinated polycarboxylic acid fluorides are polymerized using ultraviolet radiation.

We have now discovered that polyhalocarbon oxides can be produced by a new process in a convenient one-step synthesis not requiring the use of light and utilizing relatively inexpensive starting materials, thereby circumventing disadvantages of prior art processes. This new process involves introducing into a reaction zone perhaloolefin and ozone, with oxygen ($O_2$) optionally being present. The mechanism by which the process proceeds is unknown. The polymers obtained are substantially free of oxidizing linkages containing in all cases not more than about 0.07 equivalents per gram of oxidizing linkages, and in most cases less than 0.02 equivalents per gram, as determined by standard iodometric analysis.

In one aspect, this invention is directed to a process for the preparation of polyhalocarbon oxide polymers.

In another aspect, this invention is directed to the novel polyhalocarbon oxide polymers made by the aforementioned process.

In another aspect this invention is directed to novel hydrolyzed polyhalocarbon oxide polymers.

In another aspect, this invention is directed to novel stabilized polyhalocarbon oxide polymers.

In another aspect, this invention is directed to novel cured polyhalocarbon oxide polymers.

An object of the present invention is to provide new and useful polymers and processes for making the same.

Another object is to provide a process for reacting ozone and perhalocarbon compounds, especially perhalogenated olefins, to produce polymeric products.

Another object is to provide new classes of polyhalocarbon oxide polymers from perhalogenated olefins and ozone.

Another object is to provide new classes of polymers from such polyhalocarbon oxide polymers by hydrolyzing, by stabilizing, and by curing same.

Other objects and advantages of the present invention will become apparent to those skilled in the art from the accompanying description and disclosure.

In practicing the process of this invention, two classes of starting material are necessarily employed. One of the two classes of starting materials contains as the essential active (reactive) component at least about 10 mol percent perhaloolefin (based on total weight of this class of starting material). A perhaloolefin contains at least one ethylenic linkage between two carbon atoms, and is composed only of halogen (that is, fluorine and chlorine) atoms and carbon atoms. At least about 75% of all halogen atoms in a perhaloolefin as defined herein are fluorine (the remainder being chlorine), and no more than one chlorine atom is attached to a given carbon atom. Preferably, such perhaloolefins are perfluorinated, and, preferably, each such olefin molecule contains from about 2 through 15 carbon atoms. A more preferred class of perhaloolefins are perfluorinated olefins containing from 3 through 6 carbon atoms. A most preferred perhaloolefin is perfluoropropene. The perhaloolefin can be derived from any conventional source.

The other or second class of starting material used in practicing the process of this invention is a reagent mixture containing as the essential active (reactive) component at least about 0.001 weight percent ozone (based on total reagent mixture weight). This reagent mixture prior to being used in the process of this invention can be in the gas phase, in the liquid phase, or an constitute a combination thereof. The ozone can be derived from any conventional source. Oxygen can be optionally present in this reagent mixture.

In both classes of starting materials, the respective active component can be dispersed in an inert carrier or a reactive carrier. By the term "inert", reference is had to a material which does not react with either the first class or the second class of starting materials, and which does not appreciably inhibit the formation of the reaction products under the process conditions used. By the term "reactive", reference is had to a material (e.g. gas or liquid) which reacts with either the first class or the second class of starting materials under the conditions in which the process of this invention is carried out. By the term "carrier", reference is had to diluent (either in gas phase or liquid phase) which, if a liquid, forms a single-phase material with ozone, and which does not appreciably inhibit reaction between the first class or the second class of starting materials when practicing the process of this invention.

In general, the process of this invention proceeds by contact between the first class (e.g. perhaloolefin) and the second class (e.g. ozone) of starting materials. A polymerization reaction results, and this reaction apparently, though not necessarily, proceeds on the basis of a 1:1 mole ratio of olefin to ozone, judging from the observed initial consumption of reactants, although a complex reaction is involved so that one can employ a mixture containing more or less ozone than is necessary for such a 1:1 mole ratio.

This reaction is highly exothermic, one consequence of which is that it is desirable to limit the maximum quantity of unreacted ozone present in a reaction zone at any given time relative to the total amount of perhaloolefin present to a level which will prevent excessive, even explosive, rates of reaction from occurring. The process can be practiced either batchwise or continuously.

When practicing the process, it is preferred to avoid the presence of readily oxidizable materials, such as hydrocarbon grease, hydrogen-containing solvents, and the like, all of which would preferentially be attacked by the ozone, resulting in production of undesirable by-products, excessive consumption of ozone, and even the hazard of explosion. Compounds having high free radical chain transfer constants, e.g. $CCl_4$, $CHCl_3$, isobutane, and the like, are especially to be avoided.

The perhaloolefin is maintained in liquid phase when practicing the process, so reaction temperatures are usually below about 20° C., particularly when operating under atmospheric pressures. Commonly, temperatures below about −20° C. are employed, and a preferred temperature range is from about −30° C. to −100° C., though temperatures as low as about −160° C. can be used. However, at these lower temperatures, the rate of reaction between ozone and perhaloolefin may be retarded to an extent such that rate of reaction is impractically or uneconomically slow.

Although it is convenient to operate at substantially atmospheric pressure, subatmospheric or superatmospheric pressures can be used.

If oxygen is present when contact between the first class (e.g. perhaloolefin) and the second class (e.g. ozone) of starting materials occurs, it is at least in part consumed, and so apparently enters into the reaction.

The minimum contact time between the first class (e.g. perhaloolefin) and the second class (e.g. ozone) of starting materials needed for polymerization can vary, but is affected by the temperatures of the reactions, the manner in which contact between the first class (e.g. perhaloolefin) and the second class (e.g. ozone) of starting materials is effectuated, the nature of the perhaloolefin employed, and similar factors. For example, when operating the process continuously, it is generally convenient, though not necessary, to employ a reaction zone temperature which will produce rapid and smooth reaction between ozone and olefin rather than using either a low reaction zone temperature which requires excessively long contact times to produce reaction, or a reaction zone temperature which causes a reaction to proceed excessively rapidly (e.g. explosively and uncontrollably). Optimum reaction zone temperatures for a given process embodiment vary, depending on a number of considerations, such as equipment construction, reactant feed rates, pressure, contact area between reactants, and the like. When operating the process continuously, it is desirable to regulate both the reaction zone temperature and the rate of ozone input so that an excessive build-up in the reaction zone of a concentration of unreacted ozone is avoided. Such as excessive build-up is evidenced by the fact that the reaction becomes difficult to control.

In one mode of practicing this invention, a gaseous reagent mixture containing ozone in a concentration of preferably at least about 0.001 weight percent (based on total gas mixture) is introduced into a reaction zone containing perhaloolefin maintained in a liquid phase. Preferably, the perhaloolefin is maintained at a temperature not above its boiling point. The ozone can be admixed with oxygen ($O_2$) or in inert gas. Examples of inert gases include the noble gases in Group "O" of the Periodic Table (long form) or nitrogen. One suitable gas mixture is that known as "ozonized air" which is produced commercially by passing air through conventional ozonization apparatus and producing a gas stream typically containing about 1 to 2 weight percent ozone. It is preferred to utilize gaseous reagent mixtures wherein the ozone concentration is above about 1 weight percent, and still more preferably is between about 2 weight percent and 5 weight percent. In such preferred ozone containing reagent mixtures, the balance can be up to 100 weight percent oxygen. Below such concentrations, the rate of product production tends to be excessively slow while above such concentrations, the rate of reacting becomes difficult to control, other process variables being constant.

In another mode of practicing this invention, the ozone is dissolved in a liquid. The liquid can be the perhaloolefin reactant itself which is particularly convenient to use when one uses a reaction temperature of from about −70° C. to −130° C. Appropriate inert solvents (liquids) which can be used include perfluorocyclobutane, perfluoropropane, cyclo-$C_7F_{14}$, and the like. When using such a liquid phase reagent mixture system, the reactants can be charged to a sealable vessel which can withstand superatmospheric pressures. One can thus produce the desired polymers in the sealed vessel using elevated pressures. Sometimes with a liquid phase reagent mixture, a somewhat higher reaction temperature (e.g. up to about 20° C.) can be used than is the case when the reagent mixture is gaseous.

In general, the polyhalocarbon oxide products obtained from the aforedescribed process of this invention are polymeric materials characterized by containing chain backbones comprised of carbon and oxygen atoms. They usually have molecular weights ranging from about 500 to 100,000. The structures of both the lower and higher molecular weight products can be considered to belong to the same chemical family.

In general, process conditions can be regulated advantageously to give a predominance of product in a desired molecular weight region. The products are substantially colorless and can range from mobile liquids to semi-solids depending upon molecular weight. Usually they characteristically have low indices of refraction (e.g. $n_D^{25}$ usually below about 1.35). A preferred group of products are liquids.

The polyhalocarbon oxide products as obtained directly from the process of this invention characteristically contain terminal functional groups which characteristically hydrolyze in the presence of moisture (e.g. water or moist air) liberating hydrogen fluoride. These terminal functional groups thus contain hydrolyzable fluorine atoms. Owing to the adventitious presence of moisture, a product as made and analyzed commonly shows the presence of a few (—COOH) groups.

The viscosity of a polyhalocarbon oxide product obtained appears to be influenced by the concentration of ozone employed initially in the reagent mixture. For example, when one employs perfluoropropene and, as the reagent mixture, substantially pure ozone, the products characteristically are mobile, water-white liquids. Similarly, when the reagent mixture used with such olefin comprises roughly from about 2 to 5 weight percent ozone in oxygen, one obtains characteristically a water-white oil of viscosity comparable to that of about SAE 50–70 pertroleum lubricating oil. Still, similarly, when the reagent mixture contacted with that same olefin contains only about 0.001 weight percent ozone, the polyhalocarbon oxide products characteristically tend to be translucent, colorless, light greases.

We have observed that, when one increases the concentration of ozone in a reagent mixture, other process conditions being maintained substantially constant, one tends to obtain certain characteristic changes, such as:
a. decreases in average molecular weight of the product polymers, and
b. increases in the rate of reaction.

On the other hand, when one decreases the amount of ozone in a starting reagent mixture, other process conditions being maintained substantially constant, one tends to obtain certain characteristic changes, such as:
a. increases in the molecular weight of the product polymers, and
b. decreases in reaction rate.

In general, the lower in the concentration of ozone in a starting reagent mixture, the more erratic becomes the rate of ozone uptake during reaction.

One preferred class of new polyhalocarbon oxide polymers produced by practicing the process of this invention is now identified as having the characteristic formula

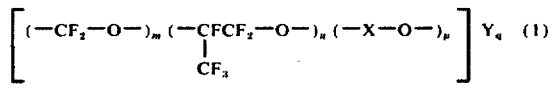

in which repeating units with subscripts $m$, $n$, and $p$ are randomly distributed along individual polymeric chains;

Y represents an end group which contains at least one and not more than three carbon atoms, and which additionally may contain at least one hydrolyzable fluorine atom, but at least one Y in each polymeric chain contains at least one hydrolyzable fluorine atom;

X—O designates a radical which is at least bifunctional, is composed only of carbon, fluorine and oxygen, and contains at least two carbon atoms, said radical being further characterized by giving rise to at least five major $F^{19}$ n.m.r. absorption bands in the regions 57–58, 75, 80, 85–86, 89, 133–134, 135–137 and 142 $\phi^*$, the total n.m.r. absorption contribution of said radical being limited to absorption bands in such regions;

$m$, $n$, $p$ and $q$ are each a positive number; $q$ is at least 2; and $p$ may additionally be zero; and the ratio of $p$ to $n$ ranges from and includes 0 to about 3.

Polymers of formula (1) characteristically have molecular weights in the range from about 500 to 100,000 and preferably have molecular weights of from about 2,500 to 70,000. The polymers of formula (1) characteristically lose less than about 30% of their initial weight during hydrolysis, and have the ratio of $m$ over $n$ in the range from about 0.02 to 60. A particularly preferred class of polymers within the scope of formula (1) has, for each Y, a fluoroformyl radical (—OCOF). In such class, the ratio of $m$ to $n$ is preferably between about 0.1 and 30.

Those skilled in the art will appreciate that the subscripts $m$, $n$ and $p$ (above and below) represent analytically derived values for specific samples and so are statistical averages. Furthermore, in polymer chains, there are preferentially present a plurality of members from the unit or group designated (—X—O—). It is the statistical average of all such members which characteristically gives rise to at least five of the $F^{19}$ n.m.r. absorption bands indicated above.

The products of this invention can be used directly (as described below) or can be hydrolyzed. Hydrolysis can be accomplished simply by repeatedly washing a polyhalocarbon oxide polymer with liquid water at room temperature until the wash water no longer contains fluorine ion. Heat may be employed to promote this hydrolysis reaction. The hydrolyzed product is conveniently dried under reduced pressure to remove excess water. Typically, hydrolysis of a polyhalocarbon oxide polymer produced in accordance with the process of this invention causes a loss of labile end sequences of the polymer chains, including not only end groups, but also some (—CF$_2$—O—) groups. Characteristically, hydrolyzed products contain carboxyl (—COOH) functional groups. When formula (1) products (above) are so hydrolyzed, there results a new class of polyhalocarbon oxide product which is characterized by the formula:

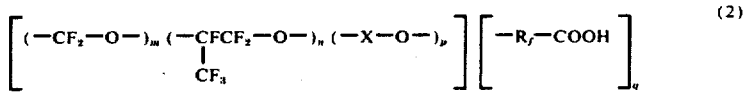

in which the repeating units with subscripts $m$, $n$ and $p$ are randomly distributed along the polymeric chains;

X—O designates a radical which is at least bifunctional composed only of carbon, fluorine and oxygen, and contains at least two carbon atoms, said radical being further characterized by giving rise to at least five major n.m.r. bands in the regions 57–58, 75, 80, 85–86, 89, 133–134, 135–137 and 142 $\phi^*$, the total n.m.r. contribution of this radical to be limited to absorptions cited in the above group;

$m$, $n$, $p$ and $q$ are positive numbers, and $p$ may be 0; the ratio of $p$ to $n$ can range from 0 to about 3; the ratio of $m$ to $n$ can range from 0.02 to 60 $q$ is at least 2; and $R_f$ is a bi-functional perfluoralkylene radical containing less than three carbon atoms.

As those skilled in the art will appreciate, the determination of the structure of polyhalocarbon oxides by purely chemical means is particularly difficult, and heavy reliance has to be placed on physical measurements. Of these, $F^{19}$ n.m.r. (nuclear magnetic resonance) spectroscopy represents the best available tool for assigning structures to these polymers. Theoretical calculations, and the comparisions of the $F^{19}$ n.m.r. spectra of many compounds of known structure have led to a number of correlations between structure and $F^{19}$ n.m.r. spectra, so that we now make structural assignments to units in these polyhalocarbon oxide polymers. The usefulness of $F^{19}$ n.m.r. spectroscopy in structure determination is illustrated in the examples below. The method is limited by sample size (at least about 100 mg. of sample), and by the number of established correlations between structure and $F^{19}$ n.m.r. spectra.

Infrared spectroscopy finds only limited application in the structure determination of polyhalocarbon oxides. It is effective in establishing the presence of certain groupings (such as, for instance, (—COOH) or (—COF) groupings) in the polymer, and in establishing close structural similarity between two samples. Just as the identity of the infrared spectra of two pure compounds denotes their identity, so the close similarity of the infrared spectra of two polymers denotes their close structural similarity. Infrared spectrum can be determined on about 1–5 mg. of sample, and is thus less limited by sample size. We have established correlations between $F^{19}$ n.m.r. spectra and infrared spectra for polymers of the same family and thus are able to advantageously utilize infrared spectra to establish generic identity between two samples, where one of them has been characterized by $F^{19}$ n.m.r.

The process of the present invention, the polyhalocarbon oxide products produced thereby, and the hydrolyzed products derived therefrom are now illustrated by the following non-limitative examples. It will be appreciated that in the examples, on the basis of the available $F^{19}$ n.m.r. and infrared spectroscopic data, and except for a change both in the functional end groups and in the labile end sequences, a backbone polymer structure is substantially unaltered by hydrolysis. Thus, analytical data supporting formula (2) structure also support formula (1) structures, and vice versa. It will be understood that when an empirical formula is given for a polymeric compound, this merely indicates the ratio of elemental constituents relative to carbon taken as 1.

EXAMPLE 1

A gaseous mixture compsing $O_2$ (95–98%) and $O_3$ (2–5%), prepared by passing oxygen through an electric discharge, is bubbled slowly (0.01 to 0.02 cu.ft./min.) through refluxing perfluoropropene (5 g) in a borosilicate glass vessel provided with an efficient dry ice (solid $CO_2$) condenser. The perfluoropropene is thus maintained at a temperature of about −30° C. A vigorous reaction is observed in this instance after a period of about 1.6 hrs. The onset of this reaction is evidenced by an erratic reflux rate, evolution of heat and of gases which fume in air (analysis shows the evolved gases to contain $COF_2$, $CF_3COF$, and other unidentified compounds), and by rapid uptake of the incoming gases by the reaction mixture. After about two hours, the reaction subsides and reflux stops. More volatile components are separated from the product mixture by distillation at 23° C./10⁻⁶ mm Hg. These more volatile components comprising materials of molecular weight of up to about 3,000 are examined separately.

The pot residue is a dense, viscous, colorless oil (about 0.5 g). This oil, examined by infrared spectroscopy, shows absorption maxima at 5.3, 5.6, 7.6–9, 10.2, 11.2, 12.4 and 13.4 $\mu$. The maximum at 5.3 $\mu$ corresponds to a (—COF) group, the 5.6 $\mu$ maximum to a (—COOH) group, the 7.6–9 $\mu$ maxima to

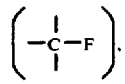

and the 10.2 $\mu$ maximum is assigned to a

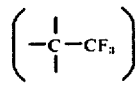

group.

Elemental analysis shows the oil to contain C, 20.3%; F, 64.3%. No hydrogen is detected by standard combustion analysis. This analysis is consistent with the empirical formula ($CF_2O_{0.57}$). Total oxidizing power as determined by potassium iodide titration is equivalent to no more than about 0.2% by weight of peroxidic oxygen. The acid equivalent is about 3200. The estimated molecular weight is about 6,000 to 10,000. The $F^{19}$ n.m.r. (nuclear magentic resonance) spectrum in $CFCl_3$ (e.g. the product available under the trade designation Freon 11, trademark of the duPont Company) shows the following chemical shifts, expressed in $\phi^*$ values to the nearest whole number (calculated according to G. V. D. Tiers, J. Phys. Chem. 63:761 (1959): 11–14(W); 53(W); 55(S); 57–58(M); 75(S); 80(V.S.); 85–86(W); 89(W); 133–134(VW); 135–137(W); 142(VW); 145(M) $\phi^*$, where (VW) stands for very weak; (W) stands for weak; (M) stands for medium; (S) stands for strong and (VS) stands for very strong bands of the particular chemical shift. These abbreviations are used in all the examples to follow.

As those skilled in the art appreciate, the $F^{19}$ n.m.r. spectra of fluorocarbon polymers provide two types of structural information: band position and band intensity. The position of a given band (that is, its chemical shift relative to $CFCl_3$, expressed in $\phi^*$ units) is determined by the structural environment of the particular type of fluorine atom; hence, the presence of a band at a given chemical shift in the $F^{19}$ n.m.r. spectrum is generally attributed to the presence of the corresponding chemical grouping in the sample, and vice versa. The intensities of the bands in an $F^{19}$ n.m.r. spectrum provide a means of estimating the relative abundance of various groups. Generally speaking, the relative intensities of the bands are proportional to the relative numbers of those fluorine atoms which give rise to these bands.

Typically, the fluorine atoms of (—OCOF) end groups give rise to bands in the region 11–14 $\phi^*$. The fluorine atoms of (—$CF_2$—O—), $CF_3O$—), and like groups, give rise to bands in the region 53–59 $\phi^*$. The fluorine atoms of (—C($CF_3$)$_2$—O—) groups give rise to bands at about 75 $\phi^*$. The fluorine atoms in ($CF_3$) and ($CF_2$) of (—CF($CF_3$)$CF_2$—O—) groups give rise to bands at about 80 $\phi^*$, while the unique fluorine atom of the (CF) of that group is seen at 145 $\phi^*$. The fluorine atoms of the middle ($CF_2$) group in a (—$CF_2$—$CF_2$—$CF_2$—) unit give rise to bands at about 122 $\phi^*$. The fluorine atoms of an epoxy group

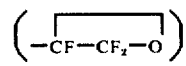

give rise to bands at about 110, 113 and 155 $\phi^*$. Fluorine atoms of a perfluorovinyl group (—CF—$CF_2$) give rise to bands 90, 106 and 190 $\phi^*$. The fluorine atom of (—COF) groups linked to perfluoroalkylene, such as, for instance, (—$CF_2$—COF) or (—CF($CF_3$)COF) give rise to absorption in the negative $\phi^*$ region, that is, at about −20 to −35 $\phi^*$.

Accordingly, the following structural features are assigned to the dense, viscous, colorless oil product of this example: The end groups are principally (—OCOF) with some (—COOH), the latter resulting from partial hydrolysis by adventitious moisture. The principal backbone repeating units are (—$CF_2$—O—), (—CF(CF$_3$)CF$_2$—O—), (—C(CF$_3$)$_2$—O—) and other structural units designated (—X—O—) in formula (1). Referring to formula (1) in which these groups are given the subscripts $m$, $n$ and $p$ respectively, in this example the ratio $m/n$ is about 1.1 and the ratio $p/n$ is about 0.77.

This product is thus identified as a functionally terminated polyfluorocarbon oxide containing the above randomly distributed chain units and having a structure which falls within the scope of formula (1).

EXAMPLE 2

Perfluoropropane (30 ml) is refluxed as described in Example 1, except that the flow of ozonized oxygen is very slow and the proportion of ozone is quite low (0.1 to 0.001%). Reflux is maintained for 20 hrs. The residue, after vacuum stripping to separate more volatile components (i.e. compounds with molecular weights below about 2,000 to 3,000 which are examined separately) is a very viscous oil (2–3 g), with a higher average molecular weight than that of the residue described in Example 1. A molecular weight range of about 3,000 to 100,000 is estimated for this oil.

The average molecular weights reported in this example and elsewhere in the specification are estimated by comparing bulk and solution viscosities for lower and higher polymers, respectively, with those of the CF$_3$NO/C$_2$F$_4$ copolymers; the latter have physical characteristics quite similar to the polyhalocarbon oxides of this invention. Their Mark-Howink constants have been determined from light scattering data; $k = 8.77 \times 10^{25}$, $a = 0.66$ (in C$_4$F$_9$)$_3$N.

The oil decomposes explosively on warming with a bare flame, but the total oxidizing power, determined by KI titration, is only about 0.22 weight per cent of peroxidic oxygen, or its equivalent. Elemental analysis shows the oil to contain C, 19.9; F, 63.7% and no detectable hydrogen, corresponding to an empirical formula of (CF$_2$O$_{0.63}$). The infrared spectrum of the oil is generally similar to that of the material obtained in Example 1, except that the absorption maximum at 10.2 $\mu$ is weak, indicating relatively few

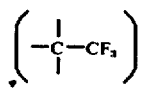

groups in the polymer.

The oil is washed with water to hydrolyze the end groups, dried and examined by F$^{19}$ n.m.r. spectroscopy in CFCl$_3$. This spectrum shows bands at the following chemical shifts: 55(W); 57–58(VW); 75(VS); 80(VS); 85–86(S); 133–134(M); 135–137(M); 142(M); 145(W) $\phi$*.

Accordingly, the following structural assignments are made to the viscous oil product of this example: The end groups are principally (—OCOF) before washing and (—COOH) after washing. Backbone repeating units of the hydrolyzed product comprise a few (—CF$_2$—O—) units, and a large proportion of (—CF(CF$_3$)CF$_2$—O—) units, (—C(CF$_3$)$_2$—O—) units and other structural units designated (—X—O—) in respective formulae (1) and (2).

Referring again to formulae (1) and (2), for the product of this example, the ratio $m/n$ is about 0.37 and the ratio $p/n$ is about 2.6.

The product of this example is thus identified as a functionally terminated polyfluorocarbon oxide containing the above randomly distributed backbone units and having a structure which falls within the scope of the formula (1) and within the scope of the formula (2) after hydrolysis.

EXAMPLE 3

Pure liquid ozone is prepared by vacuum fractionation of ozonized oxygen. The liquid (about 0.5 g) is entrained over a 2 hr. period in a stream of helium at −145° C. and the gas mixture is bubbled through perfluoropropene (4g) which is refluxed as in Example 1. Working up the crude product as in Example 1 gives a mobile water-white liquid polymer (about 0.2 g) which fumes in air and which is not explosive in the flame of a Bunsen burner.

The infrared spectrum is essentially identical to that in Example 1 except that the intensity of the (—COF) and (—COOH) absorption maxima at 5.2 and 5.6 $\mu$ is greater compared with that of

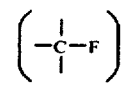

at 7.6–9 $\mu$, suggesting lower molecular weight than obtained in Example 1, in agreement with the lower viscosity. Elemental analysis of the product gives C, 21.0; F, 65.6% and no detectable hydrogen, corresponding to an empirical formula (CF$_2$O$_{0.51}$).

This product is subjected to a water wash by repeated stirring under water at room temperature. The wash water becomes acidic and is found to contain fluoride ion. The washed product thus obtained is dried at about 50° C. under vacuum. The dried product is a water-white liquid which no longer fumes in air.

The F$^{19}$ n.m.r. spectrum of the water-washed liquid polymer dissolved in CFCl$_3$ shows the following bands: 53(VW); 55(M); 57–58(VW); 75(W); 80(VS); 85–86(M); 89(VW); 145(M) $\phi$*.

Accordingly, the following structural assignments are made for the mobile liquid polymer of this example. The end groups are principally (—OCOF) before washing and (—COOH) after washing. Backbone units comprise a few (—CF$_2$—O—) units, a large proportion of (—CF(CF$_3$)—O—) units, and a few (—C(CF$_3$)$_2$—O—) and other structural units designated (—X—O—) in formulae (1) and (2). Using the subscript scheme of formulae (1) and (2), the ratio m/n is about 0.65 and the ratio p/n is about 0.52.

The product of this example is thus identified as a functionally terminated polyfluorocarbon oxide containing the above randomly distributed backbone units and having a structure which falls within the scope of formula (1) before hydrolysis, and within the scope of formula (2) after hydrolysis.

EXAMPLE 4

Perfluorobutadiene (10 ml) is refluxed in a stream of ozonized oxygen as described in Example 1. A vigorous reaction is observed in this instance after about 1.6 hr. and is complete after 2 hours. The product is a semisolid (extremely viscous) polymer (about 6 ml) which has an acid equivalent of about 370. The estimated molecular weight is about 3,000 to 10,000. The material burns in the flame of a Bunsen burner, but does not explode. Elemental analysis of the polymer gives C, 25.9; F, 61.0%, and no detectable hydrogen, corresponding to an empirical formula $(CF_{1.5}O_{0.375})$. The infrared spectrum gives intense absorption maxima at 3.2 (—OH); 5.6

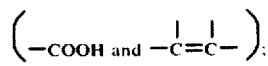

7.3; 7.6–9.2 (C—F) and 10.4

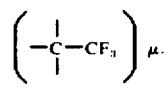

In Addition, the infrared spectrum contains a medium intensity maximum at 6.5 $\mu$, which is assigned to an epoxide grouping

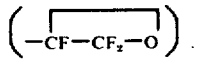

This product fumes in air. It is subjected to a water wash by repeated stirring under water at room temperature. The wash water becomes acidic and is found to contain fluoride ion. The washed product thus obtained is dried at about 50° C. under vacuum. The dried product is, like the unwashed material, a water-white semisolid. It no longer fumes in air. This washed and dried product, dissolved in $CFCl_3$, is then subjected to $F^{19}$ n.m.r. spectral analysis. The $F^{19}$ n.m.r. spectrum shows the following bands: 72(W); 79(W); 85(W); 89(VS, broad); 91–93 (M, broad); 106(W); 110(W); 113(W); 135(W); 150(M); 156–158(M); 184–190(W) $\phi$*.

The overall appearance of the spectrum is complex, suggesting the presence of a very irregular structure in the polymer even after the water wash. The washed polymer is soluble in Freon 11, and Freon 113, and in FC 75, (a trade name of the 3M Company for its commercial mixture of inert fluorocarbon compounds boiling at about 100° C.). The product also shows appreciable solubility in acetone, in keeping with the presence of oxygen (—O—) in its backbone. The index of refraction, $n_D^{25}$ is found to be 1.34. From the foregoing analytical data, the washed semisolid polymer of this example is assigned the structure of a polyfluorocarbon oxide containing in addition to backbone ether linkages, significant amounts of the following structural groupings:

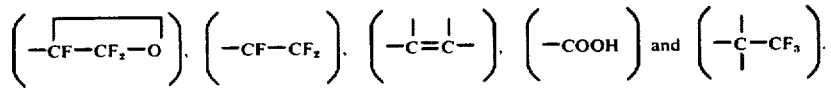

is complete after 3 hrs. Vacuum stripping of the product at 23° C./$10^{-3}$ mm Hg. to remove more volatile components gives a residue (about 2 ml) of very viscous water-white oil which fumes in air. Elemental analysis gives C, 23.4; F 58.7% and no detectable hydrogen. This corresponds to an empirical formula $(CF_{1.6}O_{0.8})$.

The infrared spectrum gives weak absorption maxima at 5.3 (—COF) and 5.6 $\mu$

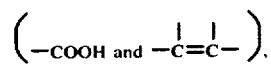

medium absorption at 6.5 $\mu$

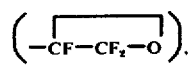

intense absorption at 7.6–9.2 $\mu$

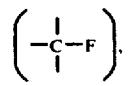

and medium absorption at 10.2

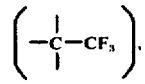

10.4–10.8, 13.5 and 14 $\mu$. This material is then water washed and vacuum dried as in Example 4. The resulting material is a water-white very viscous oil; however, it no longer fumes in air. This washed and dried product is dissolved in $CFCl_3$ and then subjected to $F^{19}$ n.m.r. spectral analysis.

The $F^{19}$ n.m.r. spectrum shows the following bands: 53(W); 55(M); 57(W); 80(S); 86(W); 89(W); 93(W); 109(M); 113(M); 134(W); 136(W); 142(W); 145(W); 150(M); 154(W); 158(W); $\phi$*.

From the foregoing analytical data, the water washed polymer of this example is assigned the structure of a polyfluorocarbon oxide in which (—$CF_2$—O—), (—$C(CF_3)_2$—O—), (—$CF(CF_3)CF_2$—O—),

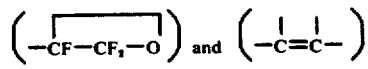

EXAMPLE 5

The experiment of Example 4 is repeated except that a mixture of perfluoropropene (12 ml) and perfluorobutadiene (3 ml) is substituted for the perfluorobutadiene alone. In this instance, the onset of vigorous reaction is detected after 1.5 hrs. The reaction groups are present in significant quantities with a large quantity of the ($CF(CF_3)CF_2$—O—) grouping being present. End groups are (—COOH), resulting from hydrolysis of (—COF) end groups. The washed product contains features common both to the polymer of Examples 1 and to the polymer of Example 4, indicating that an interpolymer derived from oxygen (—O—), perfluoropropene, and perfluorobutadiene is obtained.

EXAMPLE 6

A solution of perfluorobutadiene (0.5 Ml) in perfluoropropene (10 ml) is refluxed and treated with a gaseous reagent mixture as described in Example 1, except that the upper portion of the reaction vessel is surrounded with dry ice to provide additional cooling. The gaseous reagent mixture is introduced at the rate of about 0.002 cu.ft./min. and comprises 1–2% $O_3$ in $O_2$ by weight. After two hours the residue is freed from more volatile by-products (which are examined separately) by vacuum stripping at 24° C./10$^{-3}$ mm Hg. to give a viscous waterwhite oil which fumes in air.

Determination of the acid equivalent is difficult because of the internal buffering, but appears to be about 900. This residual viscous oil is examined by infrared spectroscopy and shows absorption maxima at 5.3 (—COF); 5.6

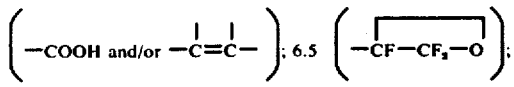; 6.5 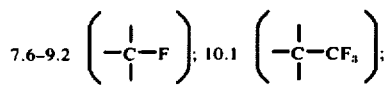;

7.6–9.2 $\left(-\underset{|}{\overset{|}{C}}-F\right)$; 10.1 $\left(-\underset{|}{\overset{|}{C}}-CF_3\right)$;

10.6; 12.5; 13.4 and 14 μ.

After hydrolysis by water washing and drying as in Example 4, a viscous water-white oil which does not fume in air is produced. The F$^{19}$ n.m.r. spectrum of this washed product dissolved in CFCl$_3$ shows the following absorption bands: 53(W); 55(M); 57(W); 75(W); 80(S, broad); 86(W); 89(W); 91(W); 109(M); 113(M); 133(W); 136(W); 143(W); 145(W); 149(M); 154(W); 156(W) φ*.

From the foregoing analytical data, the water-washed, hydrolyzed polymer is assigned the structure of a polyfluorocarbon ether in which (—CF$_2$—O—), (—C(CF$_3$)$_2$—O—), (—CF(CF$_3$)CF$_2$—O—),

and (—CF=CF$_2$) groups are present in significant quantities. (—COOH) end groups are also present resulting from the hydrolysis of (—COF) end groups in the new polymer. As in Example 5, the hydrolyzed product contains features common both to the polymer of Example 1 and the polymer of Example 4, indicating that an interpolymer derived from oxygen (—O—), perfluoropropene, and perfluorobutadiene is obtained.

EXAMPLE 7

Chlorotrifluoroethylene (40 ml) is refluxed in a stream of ozonized oxygen as described in Example 1. Stripping of the product at 23° C./10$^{-3}$ mm Hg. to separate more volatile components leaves about 0.5 g of viscous oil. The infrared spectrum of this oil shows absorption maxima at 5.3 (acylhalide), 5.6 (—COOH), 6.5

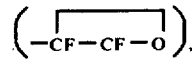

7.6–10 and 10.2 μ regions. Elemental analysis gives C, 18.2; F, 40.3; Cl, 10.3% and no detectable hydrogen corresponding to an empirical formula (CF$_{1.4}$Cl$_{0.2}$O$_{1.3}$). The index of refraction, n$_D^{25}$ is found to be 1.34.

From the foregoing analytical data, the viscous, oily polymer of this example is assigned the structure of a polyhalocarbon ether of complex backbone structure containing acyl halide and (—COOH) end groups, the latter resulting from hydrolysis of the acyl halide end groups by adventitious moisture.

EXAMPLE 8

The experimental procedure of Example 1 is repeated, substituting perfluorobutene-1 (CF$_3$CF$_2$CF=CF$_2$) (10 g) for perfluoropropene. The water-washed product (about 0.2 g) is a mobile, dense, water-white liquid which fumes in air. The infrared spectrum of this liquid shows absorption maxima at 5.6 and 7.6–9.4 μ, indicating the presence of (—COOH) and

groups.

Accordingly, the product of this example is assigned the structure of a polyfluorocarbon oxide containing (—COOH) end groups, resulting from hydrolysis of (—COF) groups.

EXAMPLE 9

Pure ozone (0.002 mol) is dissolved in Freon 11 (0.006 mol). The deep blue solution is kept without fading for 24 hours at −78° C. Addition of 0.002 mole of C$_3$F$_6$ brings about complete decolorization in 2 hrs (at −78° C.). When a freshly prepared solution of 0.002 mols each of C$_3$F$_6$ and O$_3$ in CFCl$_3$ (0.006 mol) is warmed to −78° C. the color disappears in about 2 hrs.

A solution of O$_3$ (0.001 mol) in C$_3$F$_6$ (0.006 mol) fades in 2 hrs. at −78° C.

A solution of O$_3$ (0.001 mol) and C$_3$F$_6$ (0.0009 mol) in CFCl$_3$ (0.006 mol) is kept at −78° C. for 2 hrs. The intensity of the blue color decreases, but does not disappear, indicating the presence of excess ozone. Back-titrating 0.0002 mol of C$_3$F$_6$ into this solution discharges the blue color in less than 30 minutes. These results indicate that the initial reaction of ozone with C$_3$F$_6$ involves a 1:1 mol ratio of the reactants.

This example shows that ozone combines with perhaloolefins at low temperatures in a definite stoichiometry. The structure of the initial product of this reaction is unknown, but is probably an essential intermediate in the formation of polyhalocarbon oxides according to this invention (see Example 10 below).

EXAMPLE 10

0.001 mol each of O$_3$ and C$_3$F$_6$ are frozen into a small trap and the mixture warmed to −127° C. for 3–4 hours, and then warmed to −78° C. After 3 hours in the dark at −78° C. the characteristic blue color of ozone in solution disappears. This reaction mixture is then held at −78° C. for an additional 15 hours. Following this, volatile products are removed by vacuum stripping at 23° C./10$^{-3}$ mm Hg. There remains behind a viscous, water-white oil (10–20 mg.) which fumes in air. This oil when examined by infrared spectroscopy is indistinguishable from the unhydrolyzed polymeric oil obtained in Example 1. Thus, it is demonstrated that ozone and perfluoropropane can combine directly in a 1:1 stoichiometric ratio at low temperatures in the dark in the liquid phase without diluents or other reactive materials being present. The reaction then proceeds to give rise to polymeric materials of the same class as the polymeric materials obtained by the method of Example 1 and by other examples herein.

EXAMPLE 11

A mixture of perfluoropropene (0.001 mol) and ozonized oxygen (about 0.5 ml) at −196° C., containing about 5–8% ozone) is condensed into a narrow borosilicate glass tube capable of withstanding about 50 atmospheres of pressure. The tube is sealed, allowed to warm to −126° C. and kept at that temperature for 6 hours. The internal pressure is estimated to be about 40–45 atmospheres. A blue color is noted in the reaction mixture indicating the presence of residual ozone. The tube and contents are cooled to −196° C., the tube opened and the volatile materials removed at 24° C./10$^{-3}$ mm Hg. The residue (about 20 mg) is a colorless oil, the infrared spectrum of which is substantially identical to that of the unhydrolyzed product obtained in Example 1; thus, the polyfluorocarbon oxide of this invention as represented by formula (1) can be prepared under superatmospheric pressures, with the reactants in solution in the liquid phase at temperatures as low as −126° C.

EXAMPLE 12

A solution of perfluoropropene (3 ml) in perfluorocyclobutane solvent (10 ml) is placed in a glass reaction vessel provided with an efficient dry ice condenser and a gas inlet tube. The vessel is immersed in a bath kept at −32° C. and ozonized oxygen (about 4% O$_3$) is passed in at 0.002 cu.ft./min. for three hours. The reaction mixture is then allowed to warm gradually to room temperature overnight. The product left after removal of volatile materials by vacuum distillation at 23° C./10$^{-3}$ mm Hg. is a colorless oil (about 0.3 ml). Its infrared and n.m.r. spectra are essentially identical to those described in Example 1, with minor variations in relative intensities. The polyfluorocarbon oxides of this invention as represented by formula (1) can thus be conveniently prepared under conditions wherein the starting polyfluoroolefin is in solution in an inert diluent.

EXAMPLE 13

The procedure described in Example 12 is repeated, except that commercial perfluoropropane solvent is used, and the gas stream is interrupted every 30 minutes for a duration of 15–20 minutes in order to control the vigorous reaction. The total reaction time is 6 hours. The product is separated from more volatile constituents by vacuum stripping at 23° C./10$^{-3}$ mm Hg. The resultant less volatile residue is a colorless oil (about 0;1 ml). Infrared analysis indicates the product to be essentially the same as that obtained in Example 14.

Analysis of the perfluoropropane solvent shows it to contain prior to use several impurities, some of which contain hydrogen, such as, for instance, the heptafluoropropanes. The erratic nature of the reaction and the reduced yield of product is attributed to the presence of these impurities.

EXAMPLE 14

Using the procedure of Example 1, a gaseous mixture of 2 to 5 weight per cent ozone is bubbled at the rate of about 0.05 cu.ft./min. for about 9 hours through 100 ml of liquid perfluoropropene maintained at a temperature of about −30° C. Processing of the product mixture as described in Example 1 yields a viscous, colorless oil (about 10 g) which fumes in air. The infrared spectrum shows absorption maxima at 3.2 (VW, broad, OH); 5.3(VW, —COF); 5.6(M, —COOH); 7.6–9.2

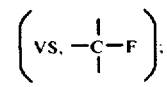

9,9–10.2

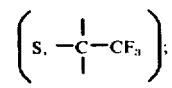

12.4(W), and 13.4(M) μ.

The viscous, colorless oil is water washed by repeated stirring under water until the wash water no longer shows the presence of fluoride ion. The washed product no longer fumes in air but is still a viscous, colorless oil. The index of refraction, n$_D^{25}$, is found to be 1.31.

The F$^{19}$ n.m.r. spectrum of the water-washed polymer in CFCl$_3$ shows the following bands: 53(VW); 55(S); 57–58(M); 75(VS); 80(VS); 85–86(S); 89(S); 133–134(M); 135–137(M); 142(M); 145(M) φ*.

From the foregoing analytical information, the following structural features are assigned to the polymer products of this example: The end groups are principally (—OCOF) with some (—COOH), the latter resulting from partial hydrolysis by adventitious moisture. The principal backbone repeating units are (—CF$_2$—O—), (—CF(CF$_3$)CF$_2$—O—), (—C(CF$_3$-)$_2$—O—), and other units designated (—X—O—) in formulae (1) and (2). Also in this product, referring again to formulae (1) and (2) in which these units are given the subscripts m, n and p, respectively, the ratio m/n is about 1.0 and the ratio p/n is about 1.6.

This product is thus identified as a functionally terminated polyfluorcarbon oxide containing the above randomly distributed chain units and having a structure which falls within the scope of formula (1) before hydrolysis and within the scope of formula (2) after hydrolysis.

This example thus demonstrates that the process of this invention can be operated and controlled on a substantially larger scale than described in Example 1.

EXAMPLE 15

Perfluoropropene (120 ml) is refluxed under a large dry ice condenser as described in Example 14. Ozonized oxygen (5–8% O$_3$ by weight) is passed into the refluxing olefin at the rate of 0.01 cu.ft./min. for 6 hours. A vigorous reaction is noted during the first hour of reaction. The product is vacuum stripped at 23° C./$10^{-3}$ mm Hg. to give about 5 ml of viscous polymeric oil. This oil is subjected to fractionation by molecular distillation at $10^{-6}$ mm Hg. Four fractions are obtained:

a. at 23° C./$10^{-5}$ mm Hg. — 0.2 ml of a mobile, colorless liquid which fumes in moist air;

b. at 50° C./$10^{-5}$ mm Hg. — 0.3 ml of a mobile, colorless oil;

c. at 60° C./$10^{-5}$ mm Hg. (10 hrs. about 2 cm path) — 0.2 ml of light, colorless oil;

d. the residue, a viscous, colorless oil.

The four fractions are examined by $F^{19}$ n.m.r. spectroscopy in $CFCl_3$ solution. The spectra have the following bands:

For a. — 11(M); 14(M); 53(S); 55(VS); 57–58(S); 75(W); 80(S); 85–86(W); 89(VW); 145(VW)$\phi$*. Accordingly, the following structural assignments are made to this polymer fraction: the end groups are (—OOOF). The principal backbone units are (—$CF_2$—O—), with some (—$CF(CF_3)CF_2$—O—), (—$C(CF_3)_2$—O—) and other units designated (—X—O—) in formula (1). Referring to formula (1) in which these units are given the subscripts m, n and p, respectively, the ratio $m/n$ is about 30 and the ratio $p/n$ is about 0.43. This fraction is thus identified as a functionally terminated polyfluorocarbon oxide containing the above randomly distributed units and having a structure which falls within the scope of formula (1).

For b. — 11–14(VW); 53(S); 55(VS); 57–58(S); 75(M); 80(S); 85–86(M); 89(W); 133–134(VW); 135–137(VW); 142(VW); 145(W) $\phi$*. Accordingly, the following structural assignments are made to this polymer fraction: The end groups are (—OCOF). The principal backbone units are (—$CF_2$—O—), (—$CF(CH_3)CF_2$—O—), (—$C(CF_3)_2$—O—) and other units designated (—X—O—) in formula (1). Referring to formula (1) in which these units are given the subscripts m, n and p, respectively, the ratio $m/n$ is about 10 and the ratio $p/n$ is about 0.86. This fraction is thus identified as a functionally terminated polyfluorocarbon oxide containing the above randomly distributed units and having a structure which falls within the scope of formula (1).

For c. — 11–14(VW); 53(M); 55(VS); 57–58(S); 75(S); 80(VS); 85–86(W); 89(W); 133–134(VW); 135–137(W); 142(VW); 145(W) $\phi$*. Accordingly, the following structural assignments are made to this polymer fraction: The end groups are (—OCOF). The principal backbone units are (—$CF_2$—O—), (—$CF(CF_3)C$-$F_2$—O—), (—$C(CF_3)_2$—O—) and other units designated (—X—O—) in formula (1). Referring to formula (1) in which these units are given the subscripts m, n and p, respectively, the ratio $m/n$ is about 3.1 and the ratio $p/n$ is about 0.79. This fraction is thus identified as a functionally terminated polyfluorocarbon oxide containing the above randomly distributed units and having a structure which falls within the scope of formula (1).

For d. — 11–14(VW); 55(W); 75(VS); 80(VS); 85–86(S); 89(S); 133–134(M); 135–137(M); 142(M); 145(S) $\phi$*. Accordingly, the following structural assignments are made to this polymer fraction. The end groups are (—OCOF). The principal backbone units are some (—$CF_2$—O—), and mainly (—$CF(CF_3)C$-$F_2$—O—), (—$C(CF_3)_2$—O—) and other units designated (—X—O—) in formula (1). Referring to formula (1) in which these units are given the subscripts m, n and p, respectively, the ratio $m/n$ is about 0.17 and the ratio $p/n$ is about 1.6. This fraction is thus identified as a functionally terminated polyfluorocarbon oxide containing the above randomly distributed units and having a structure which falls within the scope of formula (1).

Samples (a) and (d) are washed with water, dried and re-examined by $F^{19}$ n.m.r. spectroscopy. The $F^{19}$ n.m.r. spectrum of (d) is found to be unchanged by the treatment with water, except that the very weak band at 11 $\phi$* is now missing, indicating the hydrolysis of (—OCOF) end groups. This conclusion is supported by the infrared spectrum of (d), which shows weak absorption maxima at 5.3 $\mu$ (—COF) and 5.6 $\mu$ (—COOH) before hydrolysis, but only the 5.6 $\mu$ maximum after treatment with water. The acid equivalent of fraction (d) after hydrolysis is found to be about 3100. The material is cured with chromium trifluoroacetate to give a solid, elastomeric product, indicating at least bifunctionality of the hydrolyzed polymer.

The $F^{19}$ n.m.r. spectrum of (a) is substantially unchanged by water treatment, showing that the basic polymer structure is preserved. However, the (—OCOF) band disappears, and the ratio of the areas of the 53–57:80 $\phi$* bands is decreased somewhat, indicating loss of some (—$CF_2$—O—) structural component. Such a loss would be expected from partial hydrolytic degradation of a polymeric molecule containing the structure

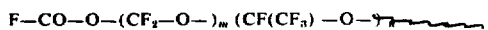

$$F-CO-O-(CF_2-O-)_m(CF(CF_3)-O-)_n$$

In the fractions (a) through (d) the analytical data indicate a progressive decrease in the average ratio $m/n$ with increasing molecular weight, while the ratio $p/n$ shows a progressive increase.

i.e. in fraction (a) $\overline{m/n}$ is 30 and $\overline{p/n}$ is 0.43 in fraction (b) $\overline{m/n}$ is 10 and $\overline{p/n}$ is 0.86 in fraction (c) $\overline{m/n}$ is 3.1 and $\overline{p/n}$ is 0.79 in fraction (d) $\overline{m/n}$ is 0.17 and $\overline{p/n}$ is 11.6 $m/n$ and $p/n$ above refer to a statistical average of the distribution of the moieties (—$CF_2$—O—) and (—$CF(CF_3)C$-$F_2$—O—), and (—$CF(CF_3)CF_2$—O—) and (—X—O—), respectively, in each sample. It is understood that depending upon the slope of the distribution curve varying numbers of the individual polymer molecules can deviate significantly from the average value.

From the boiling ranges of the fractions (a) through (d) and from the viscosities of these fractions it is estimated that the overall molecular weight range of the polymers prepared in this example is about 2,000 to 70,000.

In general, the polyhalocarbon oxides and the hydrolsed products derived therefrom which are prepared according to the processes of this invention and illustrated by Examples 1–15 above are useful as intermediates for the manufacture of the following two classes of products:

1. stabilized materials, especially liquids, useful, for instance, as heat transfer media or lubricants, and 2. cured materials and curable formulations, useful, for instance, in sealant systems and adhesive systems, and as elastomeric materials of construction, particularly where high temperature serviceability in corrosive environments is required.

In the first such class, the products produced by the process of this invention are stabilized by removal or modification of their functional groups to produce the desired stabilized materials. By the term "stabilized", reference is had to thermal stability and non-corrosiveness to metals, particularly ferrous metals. Such stabilization can be readily achieved by using any of several methods, e.g. thermal treatment, fluorination or the like.

Thermal treatment is accomplished by heating a hydrolyzed or unhydrolyzed polyhalocarbon oxide polymer product of this invention to a temperature of at least 140° C., preferably, though not necessarily, maintained under reduced pressure. Upper temperatures are determined by heat exposure time, and by similar practical considerations, so that no definite arbitrary upper temperature can be stated. The heating is continued until the polymer shows substantially no carbonyl absorption maxima at about 5.3 and 5.6 μ when examined by infrared spectroscopy.

For example, a hydrolyzed polyfluorocarbon oxide product, such as that obtained in Example 14, can be heated to a temperature above about 160° C. under reduced pressure (e.g. about 20 mm Hg.) for a time sufficient to bring about the above indicated change. During such heating step, the subatmospheric pressures are conductive to the removal of volatile by-products, particularly carbon dioxide. The predominant effect of such a thermal treatment of a hydrolyzed product polymer is to bring about decarboxylation of the terminal functional (—COOH) groups (see Example 16).

In general, stabilized products of this invention have average molecular weights of at least 400. Usually the molecular weights are less than 100,000.

Fluorination results in the removal or chemical alteration of reactive groups and is accomplished, generally, by directly treating the products of this invention with elemental fluorine in a closed vessel. Preferably, the elemental fluorine is diluted with an inert gas such as nitrogen. A suitable fluorination procedure is illustrated in British Pat. No. 1,000,802 (Spec. Pub. 8-1-1-65).

A similar procedure is illustrated in Example 17 below. Although the example describes a procedure as applied to nonhydrolyzed polymer, hydrolyzed material can likewise be employed, provided care is taken to remove residual water previously introduced in the washing (hydrolysis) operation.

Polyhalocarbon oxides stabilized by decarboxylation or fluorination are useful, depending upon their viscosity, as hydraulic fluids, heat transfer media, transformer oils, lubricants, and the like. Some of the polymeric products of this invention have the highest viscosity indices known for liquid fluorocarbon materials.

One class of new, stabilized polyfluorocarbon oxide products produced by stabilizing formulae (1) or (2) products as described above is characterized by the following generic formula:

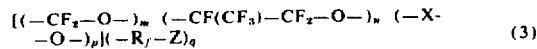

(3)

in which the repeating units with subscripts $m$, $n$ and $p$ are randomly distributed along the chains;

$R_f$ is a bifunctional perfluoroalkylene radical containing less than three carbon atoms;

Z is selected from the group F, $CF_3$ and H;

X—O designates a radical which is at least bifunctional, composed only of carbon, fluorine and oxygen, and contains at least two carbon atoms, said radical being further characterized by giving rise to at least five major n.m.r. bands in the regions 57–58, 75, 80, 85–86, 89, 133–134, 135–137 and 142 $\phi^*$, the total n.m.r. contribution of this radical to be limited to absorptions cited in the above group;

$m$, $n$, $p$ and $q$ are positive numbers, and $p$ may be zero;

the ratio of $p$ to $n$ can range from 0 to about 3;

the ratio of $m$ to $n$ can range from about 0.02 to about 60; and $q$ is at least 2.

Methods for stabilizing the polyfluorocarbon oxides of this invention and the stabilized products produced thereby are illustrated by the following non-limitative examples:

EXAMPLE 16

A hydrolyzed polymer containing (—COOH) groups (infrared absorption maximum at 5.6 μ) and prepared as described in Example 14 is heated to progressively higher temperatures in vacuo. At 80° C. some bubbling of the oil is evident. The oil is held at 170° C./10⁻⁶ mm Hg. for 48 hours during which it continues to bubble slowly and a small amount of volatile, mobile liquid is collected in the overhead trap. The pot residue is a viscous oil which no longer shows the infrared absorption the maximum at 5.6 μ characteristic of (—COOH) groups. The stabilized product thus obtained is odorless, no longer fumes in air and is apparently unaffected by heating in air to 250° C.

The $F^{19}$ n.m.r. spectrum of this stabilized product in $CFCl_3$ shows the following bands expressed in $\phi^*$ values: 53(VW); 55(S); 57–58(W); 75(VS);80(VS); 85–86(S); 89(S); 133–134(M); 135–137(M); 142(M); 145(M) $\phi^*$.

Accordingly, the following structural features are assigned to the stabilized oil product of this example. The principal backbone repeating units are (—CF$_2$—O—), (—CF(CF$_3$)CF$_2$—O—), (—C(CF$_3$)$_2$—O—) and other structural units designated (—X—O—) in formula (3). The ratio $m/n$ is about 1.0 and the ratio $p/n$ is about 1.6. The product is thus identified as an inert nonfunctional polyfluorocarbon oxide, containing the above randomly distributed chain units and having a structure which falls within the scope of formula (3).

In metal-to-metal (steel) friction tests, this stabilized oil is found to have good lubricating characteristics at 200° C. as well as at room temperature. After testing, no evidence of corrosion of the steel test specimens by the polyfluorocarbon oxide oil is found.

EXAMPLE 17

A 5.5 g sample of non-water washed polyfluorocarbon oxide obtained by the procedure of Example 14 is dissolved in 50 ml of $(C_4F_9)_3N$. Into this solution is bubbled a mixture of fluorine and nitrogen at a flow rate of 60 ml/min. of nitrogen and 10 ml/min. of fluorine at 145° C. for one hour. Following this, pure nitrogen is bubbled through the solution at a rate of 120 ml/min. while maintaining the temperature at 145° C. for an additional 30 minutes.

The solvent is stripped off at 23° C./10⁻³ mm Hg. There remains about 4 g. of a water-white oil. The infrared spectrum of this material is substantially the same as that obtained for the original starting material with the exception that bands at 5.3 and 5.6 μ corresponding to (—COF) and (—COOH) are now missing.

$F^{19}$ n.m.r. spectral analysis shows the stabilized polymeric oil to have substantially the same spectrum as the product of Example 17 and thus also to fall within the scope of formula (3).

The water-white oil thus obtained no longer fumes in air. It is stable to heating in air at 300° C. and behaves similarly to the product of Example 17 in metal-to-metal friction tests.

As indicated above, the second class of products for which the polyhalocarbon oxides of this invention are useful comprises cured materials and curable formations.

By the root word "cure", reference is had to chain extension, cross-linking, and similar forms of increasing molecular weight by a factor of at least 2 by means of chemical reaction with a polyfunctional curing agent, as described hereinafter.

In this area of utility the polyfunctional polyhalocarbon oxides of this invention are cured with polyfunctional reactive curing agents to produce solid and semi-solid products of significantly enhanced molecular weights as compared to those of the original polyhalocarbon oxide.

Optionally, before curing it may be desirable to alter the character of the functional end groups so as to make them more amenable to utilization in practicable curing systems. Thus, for example, a unhydrolyzed product with (—COF) end groups can be hydrolyzed to one with (—COOH) end groups (as described above) before curing.

In general, polyfunctional curing agents which are common to the art are suitable for curing polyhalocarbon oxides. Thus, polyalkylene polyamines, bifunctional epoxy compounds, polyhydroxy compounds, polyisocyanates, polyaziradines and the like may be advantageously employed. The prefix "poly" in this connection includes difunctional materials. Of particular utility where extreme thermal stability is desired is chromium trifluoroacetate.

When curing a composition of the invention, any convenient procedure can be used. For example, one convenient procedure is to mix a compound of formula (1) or (2) with approximately stoichiometric quantities of a polyfunctional curing agent, as by milling on a rubber mill, to achieve uniform admixture of the materials together. Instead of using a rubber mill, an alternative blending procedure is to mix the separate components together at an elevated temperature in the range of about 50° to 100° C.

At this point, it is frequently desirable to blend in fillers and other additives. Fillers are typically in the form of finely divided inert powders and are used to reduce the cost of the sealant, improve mechanical properties, and control viscosity, but usually are not essential to a sealant composition. Typical filler concentration range from about 5 to 100 parts per 100 parts of cured copolymer. Common fillers are carbon black, silica, titanium dioxide, various clays, calcium carbonate, zirconium silicate, and the like.

Particularly important and useful cured and curable products are sealant compositions. As those skilled in the art will appreciate, a sealant composition in general may have four or five components, such as a base polymer, a curing agent, a filler, a solvent, and sometimes additionally, resins to promote adhesion.

It is desirable to use as the base or starting polyhalocarbon oxide polymer one having sufficient fluidity not to require a solvent because a solvent greatly complicates application of the sealant. The polymers of this inventin usually do not require a solvent for use in sealant compositions.

After homogeneous admixture is obtained of copolymer and curing agent, the mixture is cured by any convenient procedure involving heating the mixture to a temperature typically in the range of from about 20° to 150° C. Times ranging from 10 minutes to 12 hours are conveniently employed depending upon the curing system, curing conditions, and the like.

The completion of curing can be readily determined by the change in the physical and chemical properties of the original mixture compared with the cured mixture; thus, the final product is typically an elastomeric mass and portions thereof are no longer soluble in solvents for the original copolymer.

The cured products of this invention have utility as seals, gaskets, "O" rings and the like. An area of particular utility is that in which such items must withstand extreme temperatures in the presence of corrosive, particularly highly oxidizing materials.

A particular feature of the cured materials of this invention is their unusual combination of high and low temperature serviceability. The unusual low temperature serviceability, i.e. resistance to embrittlement at low temperatures, is attributed to the low glass transition temperature below about —50° C. associated with the polyhalocarbon oxide backbone structure.

One class of new solid, cured, polyfluorocarbon oxide products of this invention is produced by curing formula (1) products or formula (2) products with a polyfunctional curing agent.

In Table I below appear examples of curing a typical unstabilized product of this invention. The polyhalocarbon oxide polymer material used in all cases is carboxyl-terminated (i.e. is hydrolyzed) and has an estimated average equivalent weight of about 3200 (unless otherwise specially noted). The polymer in each case is thoroughly mixed with about 10% by weight of the reactive curing agent (unless otherwise specifically noted), and then allowed to cure under conditions indicated. The table lists cross-linking agents, pressure of reaction and temperature of reaction, as well as the results observed.

The extent of cross-linking in the polymers cured by means of chromium trifluoroacetate is indicated by the extent of swelling in fluorocarbon solvents. For example, those cured elastomeric polymers prepared from the product of Example 14 swell several hundred per cent after one week's standing in such solvents, but do not dissolve, while those plastic cured polymers prepared from the product of Example 4 are hard waxes which do not swell appreciably even after one week's immersion in such solvents.

TABLE I

| | CURING OF POLYMERS | | | |
|---|---|---|---|---|
| Ex. No. | Polyfunctional Curing Agent | Temp. °C. | Pressure mm. Hg. | Time Hours | Results |
| 18 | hexamethylenediamine | 80 | 20 | 12 | increase in viscosity |
| 19 | triethylenetetramine | 80 | 20 | 12 | increase in |

TABLE I-continued
CURING OF POLYMERS

| Ex. No. | Polyfunctional Curing Agent | Temp. °C. | Pressure mm. Hg. | Time Hours | Results |
|---|---|---|---|---|---|
| 20 | piperazine | 23 | 740 | 2 | viscosity increase in viscosity |
| 21 | piperazine | 80 | 20 | 4 | substantial increase in viscosity |
| 22 | piperazine | 80 | 20 | 12 | wax |
| 23 | solid, hydrated $Cr'''(OCOCH_3)_3$ | 80 | 20 | 12 | increase in viscosity |
| 24 | Epon 828[2] | 23 | 740 |  | immediate increase in viscosity |
| 25 | Epon 828[2] | 23 | 740 | 2 | wax |
| 26 | Epon 828[2] | 80 | 20 | 12 | very hard wax |
| 27 | Epon 828 (1:20)[1][2] | 80 | 20 | 12 | rubbery hard wax |
| 28 | chromium trifluoroacetate in acetone + polymer in Freon 113[3] | 23 | 740 | 2 | increase in viscosity |
| 29 | chromium trifluoroacetate in acetone + polymer in Freon 113[3] | 80 | 20 | 1/2 | rubbery solid |
| 30 | chromium trifluoroacetate in acetone + polymer in Freon 113[3] | 140 | 20 | 4 | hard rubber |
| 31 | Epon 828[2] | 23 | 740 | 1/3 | tacky gum |
| 32 | Epon 828[2] | 100 | 740 | 1/3 | tough, insoluble solid |
| 33 | butylene trimesimide | 23 | 740 | 2 | semi-solid wax |
| 34 | dicyclopentadiene diepoxide | 23 | 740 | 2 | semi-solid wax |
| 35 | [4]$Cr'''$trifluoroacetate | 23 | 740 | 1/12 | substantial increase in viscosity |
| 36 | [4]$Cr'''$ trifluoroacetate | 80 | 20 | 2 | hard rubber |
| 37 | [4]butylene trimesimide | 23 | 740 | 2 | hard wax |
| 38 | [4]dicyclopentadienediepoxide | 23 | 740 | 2 | hard wax |
| 39 | [5]butylene trimesimide | 23 | 740 | 2 | substantial increase in viscosity |

[1]The curing agent is used at 5% by weight of the polymer.
[2]Epon 828 is a trademark of the Shell Chemical Company for its brand of low molecular weight epoxy resin of the diglycidyl ether of 2,2 bis(4 hydroxyphenyl) propane.
[3]Freon 113 is a trademark of the Dupont Company for its brand of trichlorotrifluoroethane.
[4]The polymer used is carboxyl terminated and has an estimated average equivalent weight of about 370. Its preparation is described in Example 4.
[5]The polymer used is mainly (-COF) terminated. Its preparation is similar to that described in Example 14, except that care is taken to avoid excessive hydrolysis of the end groups by adventitious moisture during handling.

What we claim is:

1. A process for producing polyhalocarbon oxides comprising introducing into a reaction zone as the only essential reactive components ozone and an acyclic perhaloolefin having 3 to 6 carbon atoms, while maintaining said perhaloolefin under liquid phase conditions for a period of time sufficient to directly produce, in the absence of ultraviolet light, polyhalocarbon oxide polymer substantially free of oxidizing linkages.

2. The process of claim 1 wherein atmospheric pressures and temperatures ranging from about −30° to −160° C. are employed.

3. The process of claim 1 wherein said perhaloolefin is perfluorinated.

4. The process of claim 1 wherein said ozone is dissolved in a liquid selected from the group consisting of perhaloolefin and inert solvents.

5. A process for producing polyfluorocarbon oxides comprising introducing into a reaction zone as the sole essential reactive components liquid perfluoropropene and ozone and reacting said components at about −30° C. to −100° C. for a period of time sufficient to directly produce, in the absence of ultraviolet light, polyfluorocarbon oxide polymers substantially free of oxidizing linkages.

6. A process of claim 1 wherein said perfluoropropene is maintained under reflux conditions at atmospheric pressure.

7. The process of claim 6, further comprising hydrolyzing said polyfluorocarbon oxide polymer.

* * * * *

UNITED STATES PATENT AND TRADEMARK OFFICE
CERTIFICATE OF CORRECTION

PATENT NO. : 4,003,941
DATED : January 18, 1977
INVENTOR(S) : George H. Crawford and Kicholas Kowanko It is certified that error appears in the above-identified patent and that said Letters Patent are hereby corrected as shown below:

| | | |
|---|---|---|
| Col. 1 | Line 22 | the comma after "catalyst" should be a period |
| Col. 2 | Line 24 | "an" should be -- can --. |
| Col. 4 | Line 3 | "reacting" should be -- reaction --. |
| Col. 6 | Line 39 | "60 q" should be -- 60; q --. |
| Col. 8 | Line 41 | "$CF_3O-$)" should be -- $(CF_3-O-)$ -- |
| Col. 11 | Line 20 | "Addition" should be -- addition --. |
| Col. 12 | Line 44 | "57(W); 80(S)" should read -- 57(W); 75(W); 80(S) --. |
| Col. 12 | Line 68 | "Examples" should be -- Example --. |
| Col. 13 | Line 5 | "(0.5 Ml)" should be -- (0.5 ml) --. |
| Col. 16 | Line 25 | "9,9" should be -- 9.9 --. |
| Col. 17 | Line 37 | "$CH_3$" should read -- $CF_3$ --. |
| Col. 19 | Line 25 | "conductive" should be -- conducive --. |
| Col. 24 | Line 50 | "claim 1" should be -- claim 5 --. |

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*